Patented Aug. 26, 1941

2,253,555

UNITED STATES PATENT OFFICE 2,253,555

NITRO-AMINO-PYRENES AND PROCESS FOR MAKING SAME

Peter George Carter, Manchester, England, and John Lambert Grieve, Grangemouth, Scotland, assignors to Imperial Chemical Industries Limited, a corporation of Great Britain No Drawing. Application September 9, 1938, Serial No. 229,218. In Great Britain September 9, 1937

4 Claims. (Cl. 260—578)

This invention relates to the manufacture of intermediates useful in the manufacture of dyestuffs and more particularly to derivatives of pyrene which are intermediates in the manufacture of dyestuffs.

This invention has an object to devise a method of manufacturing new pyrene derivatives which will be valuable as intermediates in the manufacture of dyestuffs. A further object is to provide such new pyrene derivatives. Further objects will appear hereinafter. These objects are accomplished by the following invention.

We have discovered that if amino pyrene (Goldschmiedt-Monatshefte für Chemie, 1881, 2, 582) is converted into an acyl amino (including in that term both aliphatic and aromatic acyl) derivative by acylation and the product nitrated, products which are di nitro acyl or di nitro-aroyl amino pyrenes may be obtained. These compounds can be hydrolysed to dinitro amino pyrenes which are new products.

Thus aminopyrene can be acetylated, and nitrated to a mono nitro acetyl amino pyrene which can be again nitrated to a dinitro acetyl amino pyrene which on removal of the acetyl group by hydrolysis can be converted into a new dinitro amino pyrene which is red-brown in colour and melts at 235–245° C. with decomposition.

Further aminopyrene can be converted into phthalimido pyrene by aroylation with phthalic anhydride and the product can be di nitrated and the resulting products hydrolysed to dinitro amino pyrenes. The dinitroaminopyrene is red-brown in colour. Also, if aminopyrene is aroylated to benzoylaminopyrene, the benzoylaminopyrene may be dinitrated, and then hydrolysed to a dinitroaminopyrene. This dinitroaminopyrene is a different compound from the dinitroaminopyrene which is obtained from 1-phthalimidopyrene and is a new compound. It is red in colour and melts at 295–300° C. with decomposition.

The following examples in which the parts are by weight illustrate but do not limit the invention.

Example 1

56 parts of amino pyrene, 38 parts of phthalic anhydride, and 200 parts of pyridine are boiled under reflux for 15 minutes. The mixture is filtered when cold, and the solid washed with ethyl alcohol and dried, when 61 parts of substantially pure 1-phthalimidopyrene are obtained. This new compound is in the form of pale greenish-yellow needles of melting point 282–284° C.

50 parts of the 1-phthalimidopyrene obtained as above are milled to a fine aqueous paste with 25 parts of water and 1 part of cetyltrimethylammonium bromide. To this paste there are then added 630 parts of nitric acid of S. G. 1.4, milling is continued for a further 21 hours, and the solid then filtered off, washed and dried. 57 parts of dinitrophthalimidopyrene are obtained. This material may be crystallised from nitrobenzene, when a yellow crystalline product melting above 360° is obtained.

10 parts of crystallised dinitrophthalimidopyrene are heated under pressure for 20 hours at 150–160° C. with 350 parts of ethyl alcohol and 120 parts of ammonia (S. G. 0.88). The product is poured into water, filtered and the red solid extracted with 100 parts of warm pyridine. The pyridine extract is acidified with dilute hydrochloric acid and the precipitate is collected, washed and dried. 6 parts of dinitroaminopyrene are obtained; after one crystallisation from o-dichlorobenzene it is obtained as a dark red solid of melting point 215–218° C.

Example 2

26 parts of aminopyrene are stirred in 450 parts of hot benzene while 16 parts of acetic anhydride are dropped in. Heat is developed and acetylaminopyrene is precipitated, filtered and dried. The yield is 27 parts. The product is recrystallised from nitrobenzene. Material of M. P. 259–260° C. is obtained.

92 parts of the recrystallised acetylaminopyrene, which has been obtained in the above way, are milled to a fine aqueous paste with 920 parts of water and 0.2 part of cetyltrimethyl ammonium bromide (as dispersing agent). To this there are then added 1520 parts of nitric acid of S. G. 1.16, milling is continued for a further 20 hours, the solid filtered off and washed and dried. 110 parts of mono nitroacetylaminopyrene are obtained. This material may be crystallised from nitrobenzene, when nitroacetylaminopyrene of M. P. 256–258° C. is obtained. It is a light yellow coloured substance.

65 parts of this mononitroacetylaminopyrene are milled to a fine aqueous paste with 650 parts of water and 1 part of cetyltrimethylammonium bromide. To this paste there are then added 850 parts of nitric acid of S. G. 1.36. Milling is continued for a further 20 hours and the solid then filtered off, washed and dried. After three crystallisations from nitrobenzene 35 parts of pure dinitroacetylaminopyrene are obtained. This new compound is in the form of red rhombs of melting point 314–316° C. (with decomposition).

10 parts of dinitroacetylaminopyrene are heated under pressure for 20 hours at 135–140° C. with 250 parts of ethyl alcohol and 100 parts of ammonia (S. G. 0.88). The product is poured into water, filtered and the red solid extracted with 100 parts of warm pyridine. The pyridine extract is acidified with dilute hydrochloric acid and the precipitate is collected, washed and dried. 2.7 parts of dinitroaminopyrene are obtained; it is a red-brown solid which melts with decomposition at 235–245° C.

*Example 3*

10 parts of aminopyrene, dissolved in 50 parts of pyridine, are treated, while stirring, with 7 parts of benzoyl chloride added over 10 minutes. The product is then diluted with water, filtered and the yellow solid washed with ethyl alcohol and dried. 14.4 parts of substantially pure 1-benzoyl-aminopyrene are obtained. This material may be crystallised from 50 parts of nitrobenzene when 11 parts of the pure product are obtained; it forms greenish-yellow needles melting at 236–237° C.

10 parts of the crystallised 1-benzoylaminopyrene are milled to a fine aqueous paste with 80 parts of water and a trace of cetyltrimethylammonium bromide. To this paste there are then added 206 parts of nitric acid of S. G. 1.27, milling is continued for a further 24 hours and the solid then filtered off, washed and dried. 12.5 parts of crude dinitrobenzoylaminopyrene are obtained. This material may be crystallised from o-dichlorobenzene when 8.6 parts of the pure product are obtained; the dinitrobenzoylaminopyrene forms orange-red needles which melt at 345–347° C.

10 parts of crystallised dinitrobenzoylaminopyrene are heated under pressure for 20 hours at 160° C. with 250 parts of ethyl alcohol and 100 parts of ammonia (S. G. 0.88). The product is poured into water, filtered and the solid extracted by boiling with 100 parts of pyridine, cooling the mixture and filtering. The pyridine extract is acidified with dilute hydrochloric acid and the dark-red precipitate collected, washed and dried. 2.5 parts of dinitroaminopyrene are obtained; it melts with decomposition at 295–300° C.

In the examples instead of using acetic anhydride, benzoyl chloride or phthalic anhydride as the acylating agent we could have used any other acylating agent, e. g. propionyl chloride, oxalyl chloride, naphthoylchloride, 1:8-naphthalic anhydride and p-nitrobenzoyl chloride. In the claims below the words "acyl," "acylating" shall be understood as limited to the acidyl radicals derived from organic carboxylic acids, as distinguished from organic sulfonic, phosphonic, arsonic acids, etc.

The dinitroaminopyrenes and the dinitroaroylaminopyrenes are valuable intermediates in the manufacture of dyestuffs.

As many apparently widely different embodiments of this invention may be made without departing from the spirit and scope thereof it is to be understood that the invention is not limited to the specific embodiments thereof except as defined in the appended claims.

We claim:

1. A process for the manufacture of dinitroaminopyrenes which comprises treating amino pyrene with an acylating agent selected from the group consisting of lower aliphatic carboxylic acids and aromatic carboxylic acids of the benzene and naphthalene series to convert the same into the corresponding acylamidopyrene, reacting upon the latter compound with an excess over two moles of nitric acid of not less than 30% concentration, whereby a dinitro-acylaminopyrene is produced, and then heating the latter compound with alcoholic ammonia under pressure to hydrolize off the acyl radical, producing a dinitro-amino-pyrene.

2. A process for the manufacture of dinitroaminopyrenes which comprises treating amino pyrene with phthalic anhydride to obtain 1-phthalimido pyrene, reacting upon the latter compound with an excess over two moles of nitric acid whereby dinitro-1-phthalimido-pyrene is obtained, and then heating the latter with alcoholic ammonia under pressure to hydrolize off the phthalyl radical, producing a dinitro-amino-pyrene.

3. A process for the manufacture of dinitroaminopyrenes which comprises treating amino pyrene with benzoyl chloride to obtain 1-benzoyl amino pyrene, reacting upon the latter compound with an excess over two moles of concentrated nitric acid of not less than 30% concentration whereby dinitro-1-benzoyl-amino-pyrene is obtained, and then heating the latter with alcoholic ammonia under pressure to hydrolize off the benzoyl radical, producing a dinitro-amino-pyrene.

4. Di-nitro amino pyrene.

PETER GEORGE CARTER.
JOHN LAMBERT GRIEVE.